United States Patent [19]

Shibasaki et al.

[11] Patent Number: 5,611,028
[45] Date of Patent: Mar. 11, 1997

[54] IMAGE PROCESSING METHOD AND SYSTEM FOR COLORING AN IMAGE WITH GROUPS OF COLORS WHICH PRODUCE A DESIRED IMPRESSION

[75] Inventors: Souhei Shibasaki; Yukio Sawano; Hiroto Nagashima; Kyuichi Fujisawa; Koichi Sugiyama; Shuichi Aratsu, all of Tokyo, Japan

[73] Assignees: Fuji Photo Film Co., Ltd., Kanagawa; Alps Electric Co., Ltd., Tokyo, both of Japan

[21] Appl. No.: 245,539

[22] Filed: May 18, 1994

[30] Foreign Application Priority Data

May 18, 1993 [JP] Japan .................................. 5-139004

[51] Int. Cl.⁶ ............................................. G09G 1/28
[52] U.S. Cl. .............................................. 395/131
[58] Field of Search .............................. 395/131, 129, 395/155

[56] References Cited

U.S. PATENT DOCUMENTS

| | | | |
|---|---|---|---|
| 4,337,046 | 6/1982 | Anderson et al. | 434/103 |
| 5,185,850 | 2/1995 | Usui et al. | 395/22 |
| 5,311,212 | 5/1994 | Beretta | 345/150 |
| 5,386,496 | 1/1995 | Arai et al. | 395/22 |
| 5,424,945 | 1/1995 | Bell | 364/419.2 |

FOREIGN PATENT DOCUMENTS

| | | |
|---|---|---|
| 0333475 | 9/1989 | European Pat. Off. . |
| 0414415 | 2/1991 | European Pat. Off. . |
| 2220331 | 1/1990 | United Kingdom . |

OTHER PUBLICATIONS

Usui, Shiro et al, Color Opponency as the Internal Representation Acquired by a Three–Layered Neural Network Model, Neural Networks, 1993 International Conference, pp. 1327–1332.

Healey, Glen et al, A Color Metric for Computer Vision, Computer Vision and Pattern Recognition, pp. 10–17, (1988).

OmniPage Professional, Image Assistant, *Caere Corporation*, pp. 21–27, 1993.

IEEE International Conference on Fuzzy Systems, Mar. 8–12, 1992, pp. 5–12, Nakanishi et al.

*Primary Examiner*—Heather R. Herndon
*Assistant Examiner*—Rudolph J. Bucher
*Attorney, Agent, or Firm*—Sughrue, Mion, Zinn, Macpeak & Seas

[57] ABSTRACT

An image processing method of coloring an image with colors of well harmonized or matched group. Plural color groups, each including plural grouped colors and giving an individually different mental effect or impression, are stored in a memory, and a specified color group is selected from the stored plural color groups to color the image with colors included in the thus selected color group. Also provided is a system for the practice of the method described above. The system comprises image display means for displaying a colored image, memory means for storing plural color groups, each including plural grouped colors and giving an individually different mental effect or impression, area input means for defining one or more areas to be colored with desired colors, color input means for selecting a specified color group from the plural color groups and designating particular colors included in the thus selected color group, and coloring processor means for coloring the areas with the particular colors designated through the color input means.

7 Claims, 12 Drawing Sheets

IMAGE PROCESSING METHOD AND SYSTEM FOR COLORING AN IMAGE WITH GROUPS OF COLORS WHICH PRODUCE A DESIRED IMPRESSION

BACKGROUND OF THE INVENTION

1. Field of the Invention

The present invention relates to an image processing method of coloring an image of an original document read through a scanner or like image reader to give coloring to specified regions of the image with desired colors, and an image processing system used for the practice of the image processing method.

2. Prior Art Statement

There is known an image processing system by which an image of a document is read through a scanner, and the thus read image is colored or a part of the image is taken out to be combined with other images or subjected to various image processing, and then put out the thus processed image to a printer.

The areas of the image, which are to be subjected to image processing, are designated by a digitizer or like area input means, and the designated areas are colored and/or patterned. However, professional sense supported by a lot of experience is required to selectively determine the colors from variant colors. For instance, in color printing, by varying the intensities and ratios of three primary colors, enormous number (for example, up to 260,000) of colors could be put out.

In the known image processing system, a predetermined number (for example 512) of colors are registered as standard colors, so that the system may be readily used by a non-professional or untrained person. In some systems, a pre-set number (for example 50) of colors, which are most frequently used, are registered as basic colors and an additional number (for example 30) of colors are registered as an optional group to help easier and earlier color selection by the user.

However, even if the number of colors has been thus restricted, selection of colors requires professional sense and experiences. The color range is changed depending on the color tone used to express some desired impressions.

In order to give different impressions, such as elegant, sporty, classic or modernized atmospohere, the used colors must be delicately varied. In other words, different colors give different impressions to individual persons, and the mental affection induced by particular color is generally common to individuals although the intensities of affection are somehow different.

As to the hue, warm and cold impressions are given by warm colors (reddish purple, red, yellowish red and other yellowish colors) and cold colors (bluish green, blue and bluish purple colors). Positive emotion, such as excitement, activity or delightfulness is induced by a warm color, whereas negative or passive emotion, such as stillness, profoundness or loneliness is induced by a cold color. The brightness of color gives a bright or heavy mental emotion such that a bright color is bound to a light, soft, plain, cool, clean and static feeling, whereas a dark color is bound to a dignified, calm, old or traditional impression. On the other hand, the color saturation (chroma) is mainly connected to a mental affection of gaudy or sober impression, so that a vivid color induces violence, passion or activity whereas a somber color induces gentleness, modesty, soundness and dreary (desolate) feeling.

As should be seen from the foregoing that since colors give or induce variable mental effect to a person who sees the colored image, professional knowledge is required in determination of color arrangement, or determination of color arrangement is difficult without proffesional knowledge. Failure of color arrangement leads to useless printed copies.

OBJECTS AND SUMMARY OF THE INVENTION

Accordingly, a first object of this invention is to provide an image processing method by which a color arrangement or color scheme having a desired impression can be decided by a person having no particular professional knowledge and experience to produce a colored image copy without failure. A second object of this invention is to provide an image processing system used for the practice of the image processing method as aforementioned.

The first object of the invention is attained by the provision of an image processing method of coloring an image displayed on display means, characterized in that plural color groups each including plural grouped colors and giving different mental effects or impressions are stored in a memory, and that a specified color group is selected from said plural color groups to color the image with variant colors included in the thus selected color group.

The second object of the invention is attained by the provision of an image processing system for coloring an image and putting out colored image data, comprising image display means for displaying the image filled with a color, memory means for storing plural color groups each including plural grouped colors and giving different mental effects or impressions, area input means for defining one or more areas to be colored with desired colors, color input means for selecting a specified color group from said plural color groups and designating particular colors included in the thus selected color group, and coloring processor means for coloring said areas with said particular colors designated through said color input means.

BRIEF DESCRIPTION OF APPENDED DRAWINGS

DESCRIPTION OF PREFERRED EMBODIMENT

Figure 5:
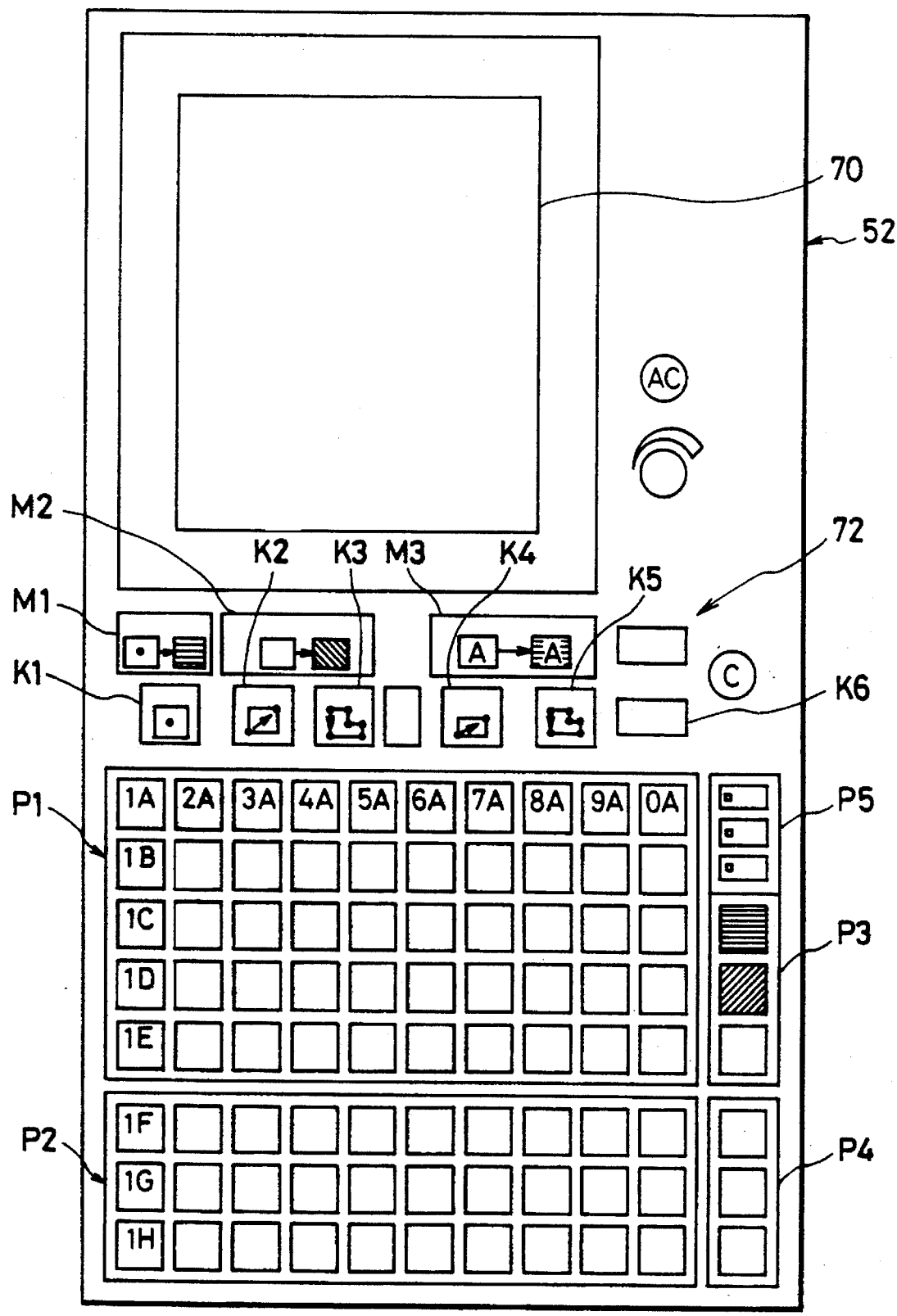
FIG. 5 is a plan view showing the upper face of a panel covering the scanner.
Figure 6:
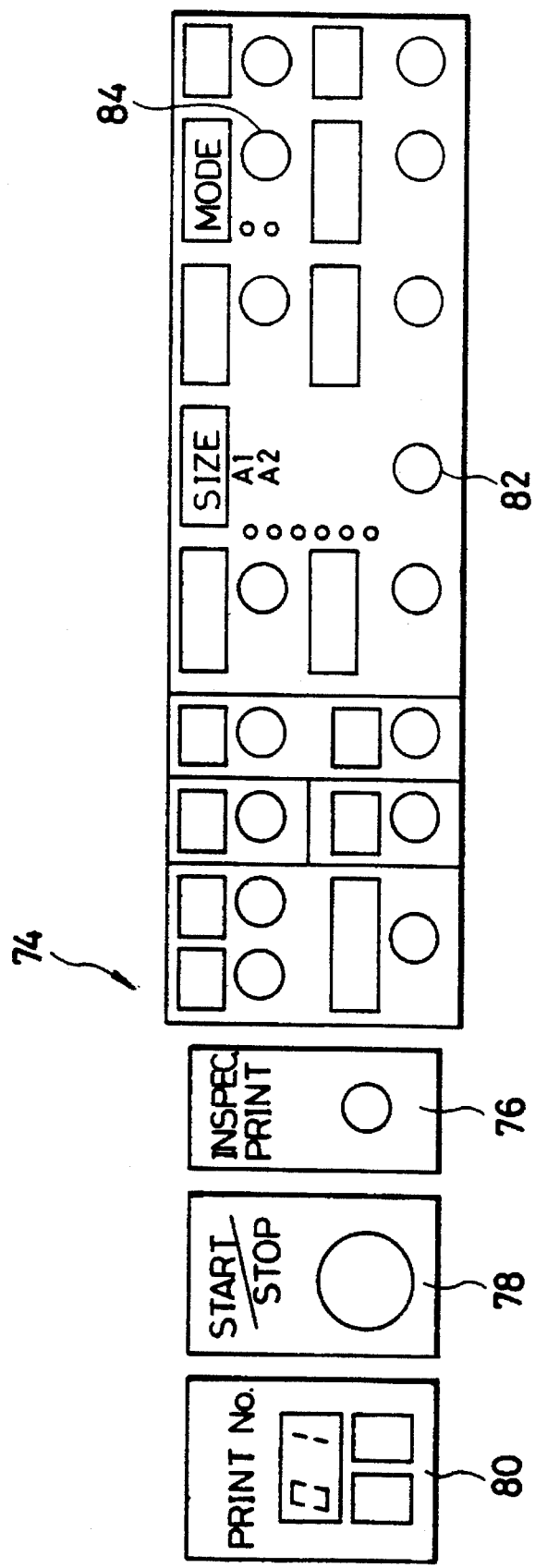
FIG. 6 is a view showing the arrangement of keys on the operation panel.
Figure 7:
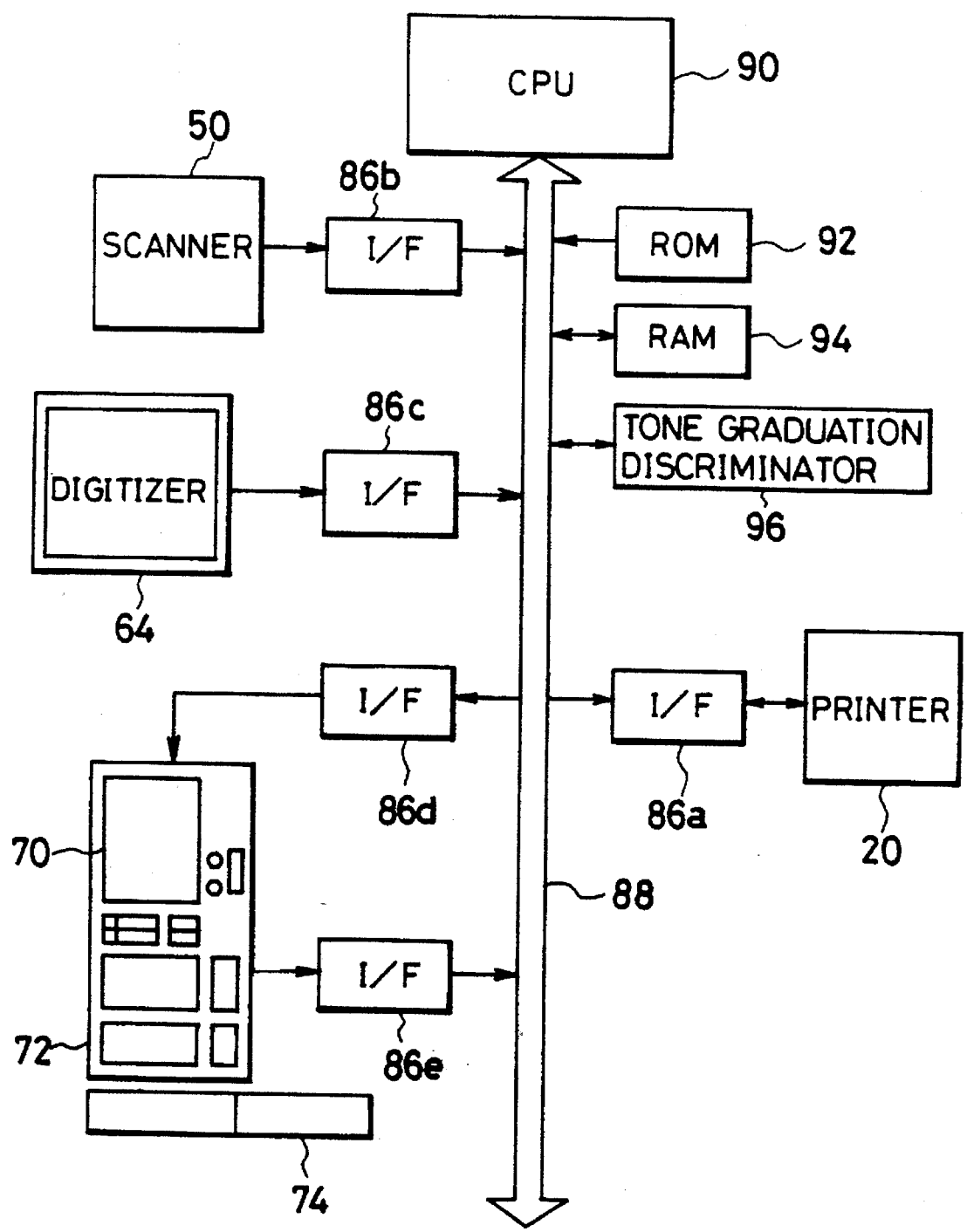
FIG. 7 is a block diagram schematically showing an embodiment of the system of the invention.
Figure 8:
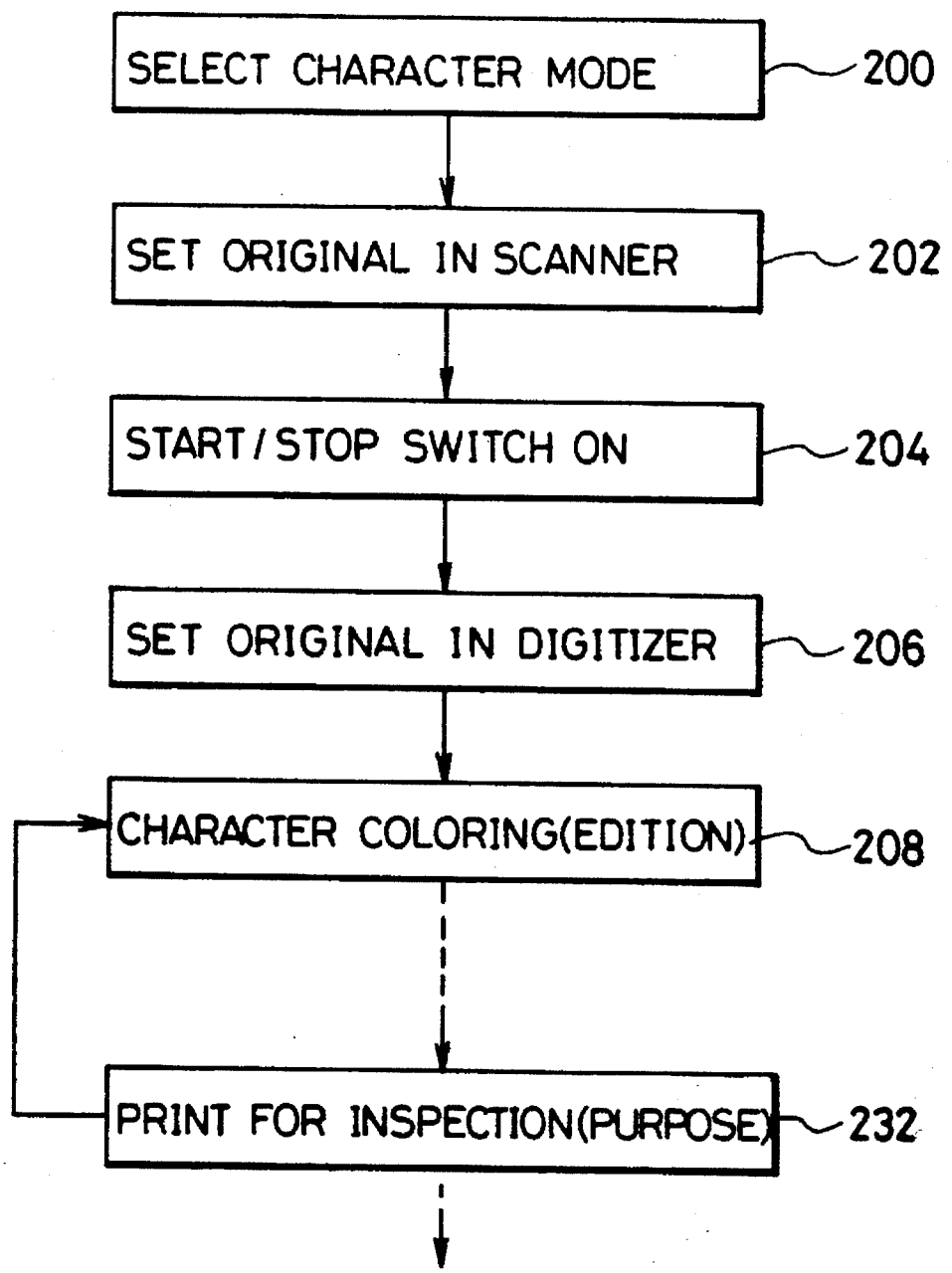
FIG. 8 is a flow chart showing the operation sequence carried out by the system of the invention.
Figure 9:
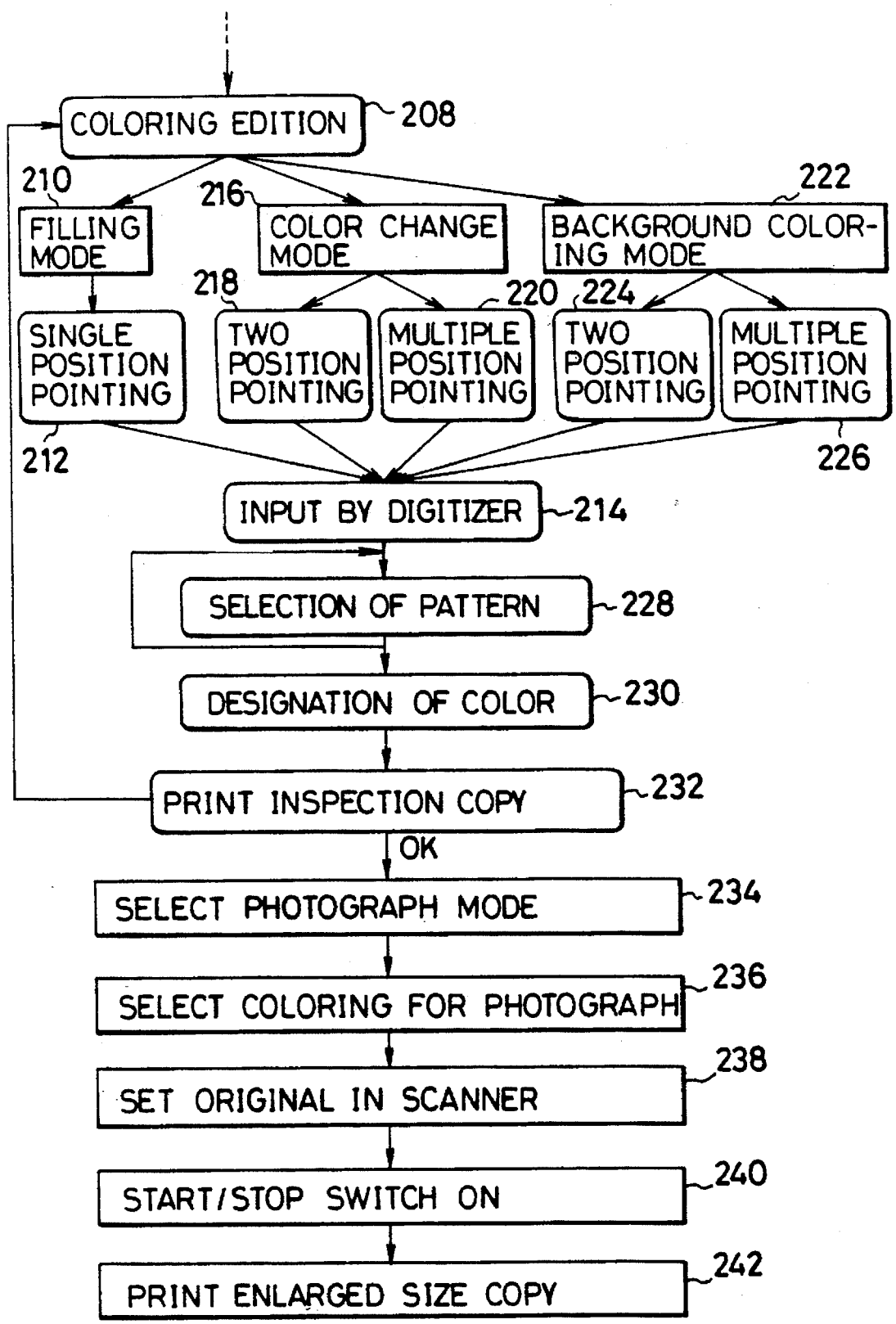
FIG. 9 is a flow chart showing the operations taking place in the latter stage of the operation sequence.

Presently preferred embodiments of the invention will now be described with reference to the appended drawings, in which: FIGS. 1 to 4 are views showing the construction of the system used in the invention; FIG. 5 and 6 show, respectively, the upper face of a panel covering the scanner and the arrangement of keys on the operation panel; FIG. 7 is a block diagram schematically showing the system; and FIGS. 8 and 9 are flow charts showing operation sequences.

Figure 10:
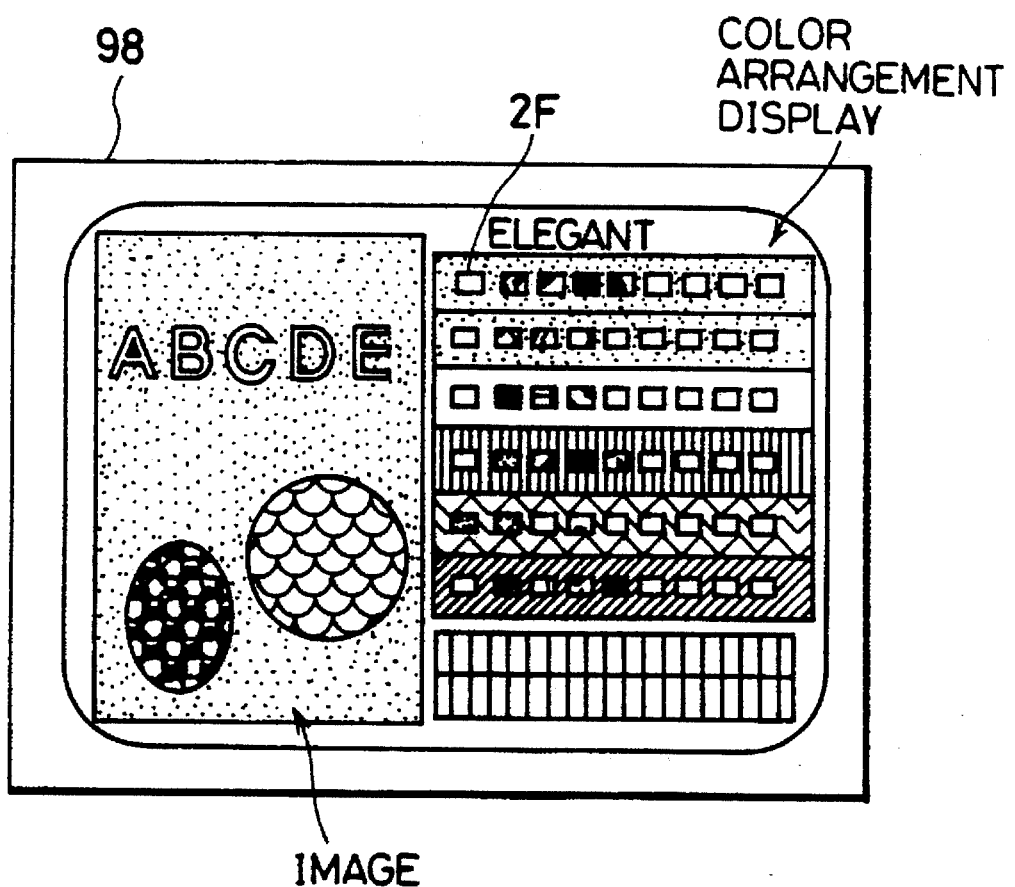
FIG. 10 is a diagrammatical illustration showing an exemplified image on the display face of a CRT monitor.
Figure 11:
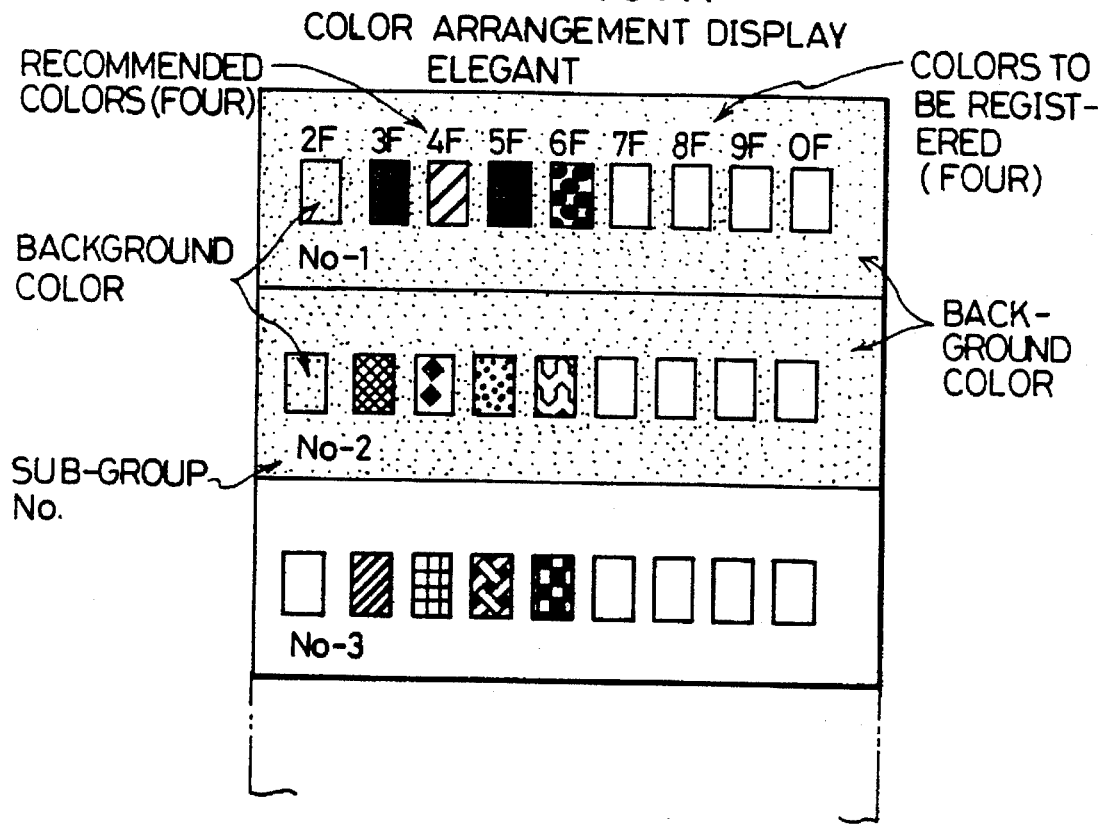
FIG. 11 is an enlarged view of a portion of the image shown in FIG. 10, the enlarged portion of this Figure showing the color arrangements or color groups.
Figure 12:
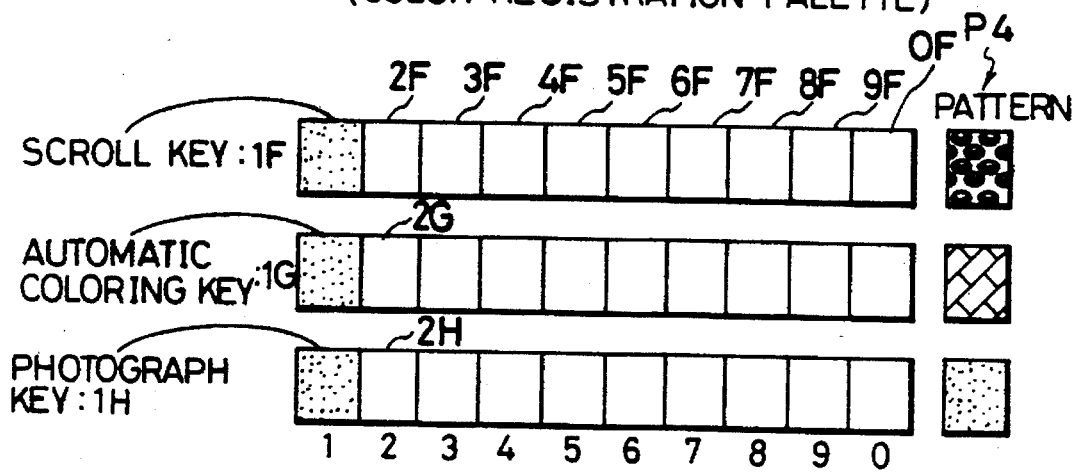
FIG. 12 is a diagrammatical view showing the arrangement on the pallete used for selecting desired colors from registered colors.
Figure 13:
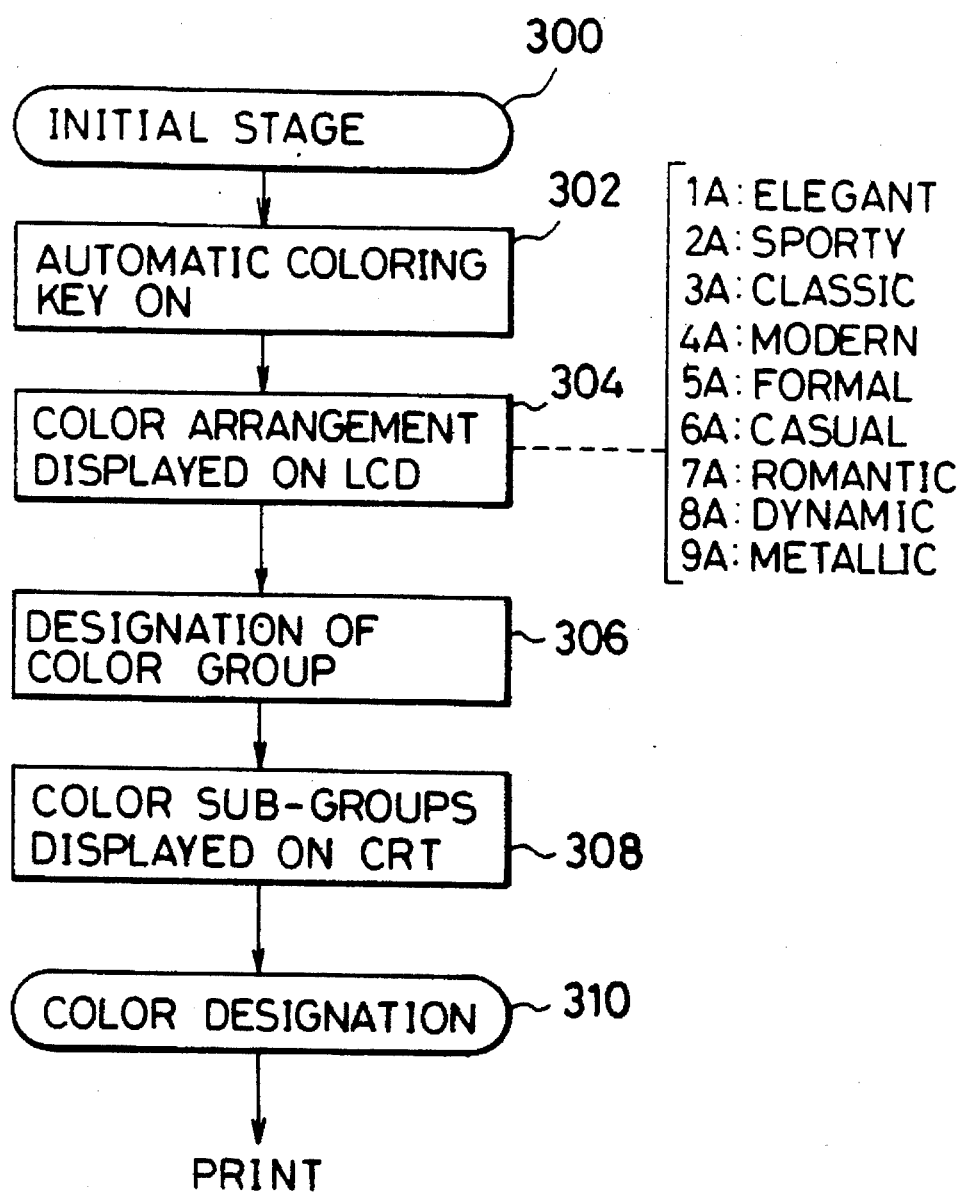
FIG. 13 is a flow chart showing the operation sequence in the automatic color arranging mode.
Figure 14:
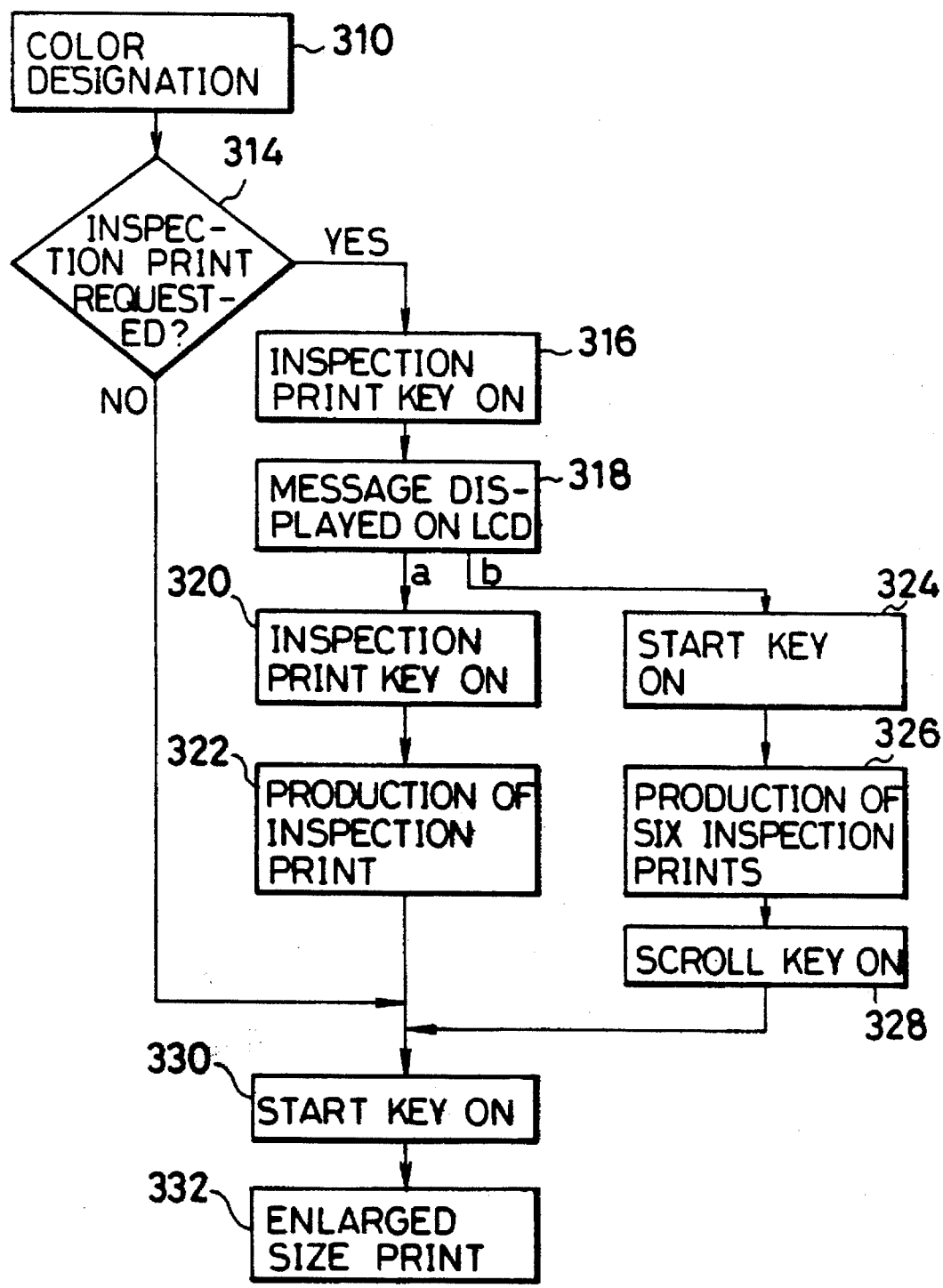
FIG. 14 is a flow chart showing the operation sequence for producing a printed copy for inspection or visual examination.

FIG. 10 is a diagrammatical illustration showing an exemplified image on the display face of a CRT monitor; FIG. 11 is an enlarged view of a portion of the image shown in FIG. 10, the enlarged portion of this Figure showing the color arrangements or color groups; FIG. 12 is a diagrammatical view showing the arrangement on the pallete used for selecting desired colors from registered colors; FIG. 13 is a flow chart showing the operation sequence in the automatic color arranging mode; and FIG. 14 is a flow chart showing the operation sequence for producing a printed copy for inspection or visual examination.

Figure 1:
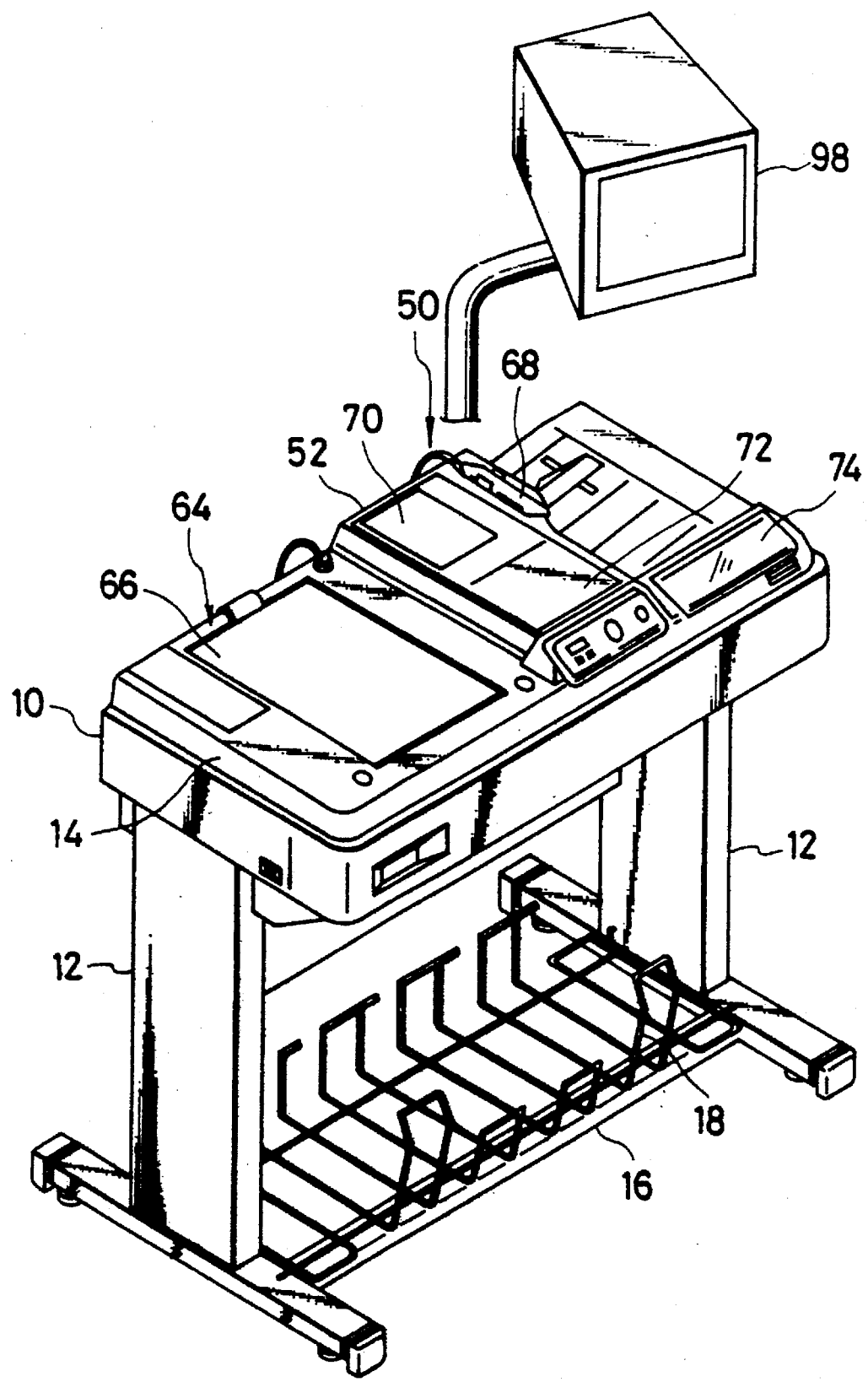
FIG. 1 is a perspective view of one embodiment of the image processing system according to the invention.
Figure 2:
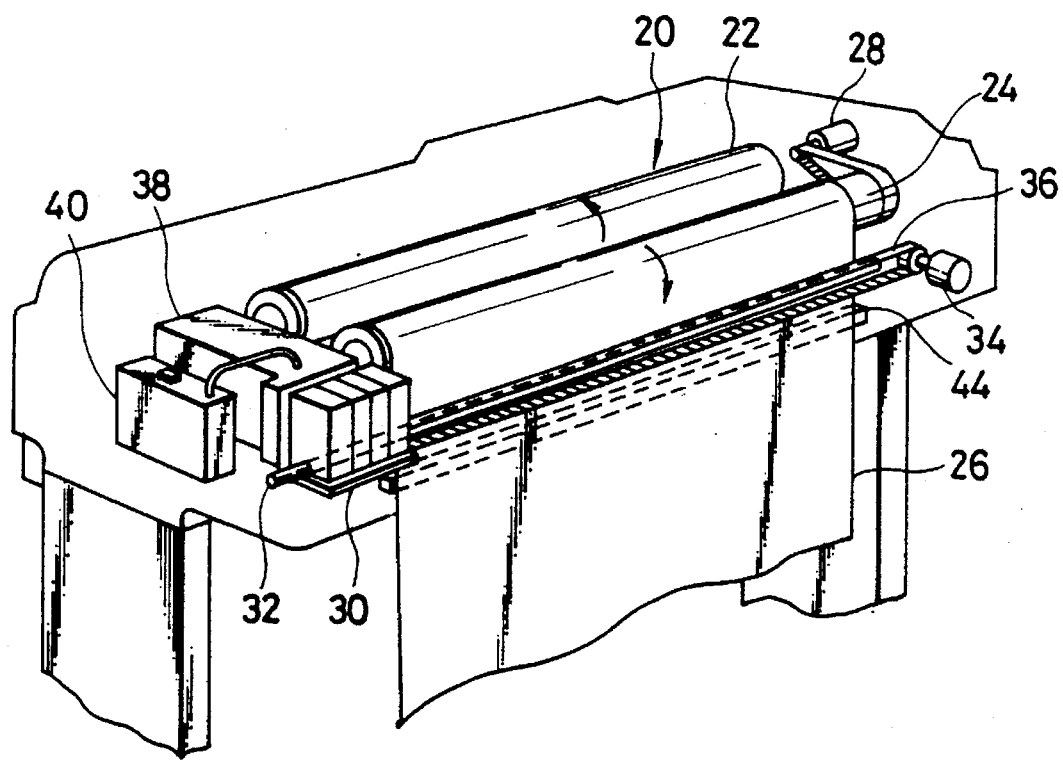
FIG. 2 is a perspective view showing the construction of an inner part of the system of FIG. 1.

Initially referring to FIGS. 1 to 4, the construction of the system will be described. Reference numeral 10 in FIG. 1 designates a housing elongated in the horizontal direction, and the housing 10 has paired left and right standing legs 12, 12 for holding the housing 10 horizontally. The top face of the housing 10 is covered by a lid or panel 14 which may be opened upwards and closed to cover the top face of the housing 10 as shown in FIG. 2. The lower foot segments of the standing legs 12, 12 are connected with each other through one or more cross-members 16 on which a rack 18 for receiving printed copy sheets is mounted.

Figure 3:
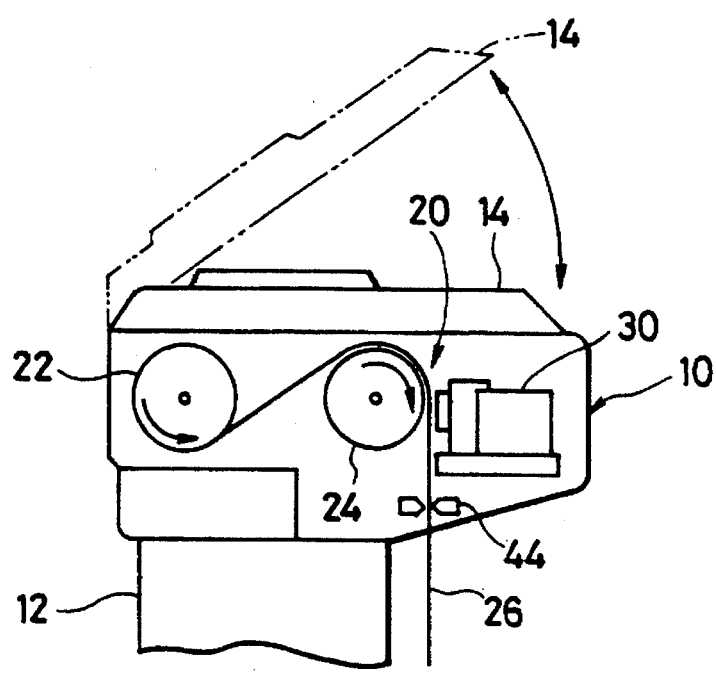
FIG. 3 is a side view of the system when viewed from the left side in FIG. 2.

Referring to FIGS. 2 and 3, a printer 20 is contained in the housing 10. The printer 20 comprises a paper feed roller 22 and a platen 24, both extending in the horozontal direction in parallel with each other. The platen 24 is located before the paper feed roller 22 to be positioned closer to the front side of the system, and a paper sheet 26 drawn from the lower peripheral edge of the paper feed roller 22 is taken up by the platen 24 to pass through the front peripheral edge of the platen 24 to be lead in the downward direction. The platen 24 is driven by a feed motor 28.

The printer 20 further comprises a printing head 30 running in the horizontal direction along the front periperal portion of the platen 24. The printing head 30 is guided by a guide rod 32 and driven in the horizontal direction by the action of a belt 36 which is in turn driven by a carriage motor 34. In the illustrated embodiment, the printing head 30 is of ink-jet type having ink ejecting nozzles which are closed by a capping 38 at the home position so that drying of the ink ejecting nozzle ports is prevented and the nozzle ports are also subjected to cleaning at the home position.

Reference numeral 40 designates a waste liquid (waste ink) tank for collecting waste ink ejected into the capping part 38 at the cleaning operation. Meanwhile, the printing head 30 includes four ink tanks respectively containing yellow, magenta, cyan and black inks, and four nozzles each communicating with a corresponding tank. The region or zone printed by the printing head 30 is denoted by reference numeral 42 in FIG. 4.

A cutter 44 is disposed below the platen 24 to cut the paper sheet 26. In detail, the cutter 44 comprises a fixed blade (not shown) and a movable blade (not shown) positioned opposingly to form a gap beteen which the paper sheet 26 travels downwards. Upon actuation of the movable blade by a motor (not shown), the movable blade comes close to the fixed blade to cut the paper sheet 26.

A scanner 50 is disposed on the right portion on the top face of the panel 14. The scanner 50 comprises a cover lid 52, a conveyer mechanism (FIG. 4) for conveying an original (document) 53 through a gap between the bottom face of the cover lid 52 and the top face of the panel or cover lid 14 of the housing 10, a CCD line sensor 54 housed in the housing 10, and an optical system (FIG. 4) for transmitting the image along the main scanning line, which extends perpendicur to the travelling direction of the original document 53, to a line sensor 54.

Figure 4:
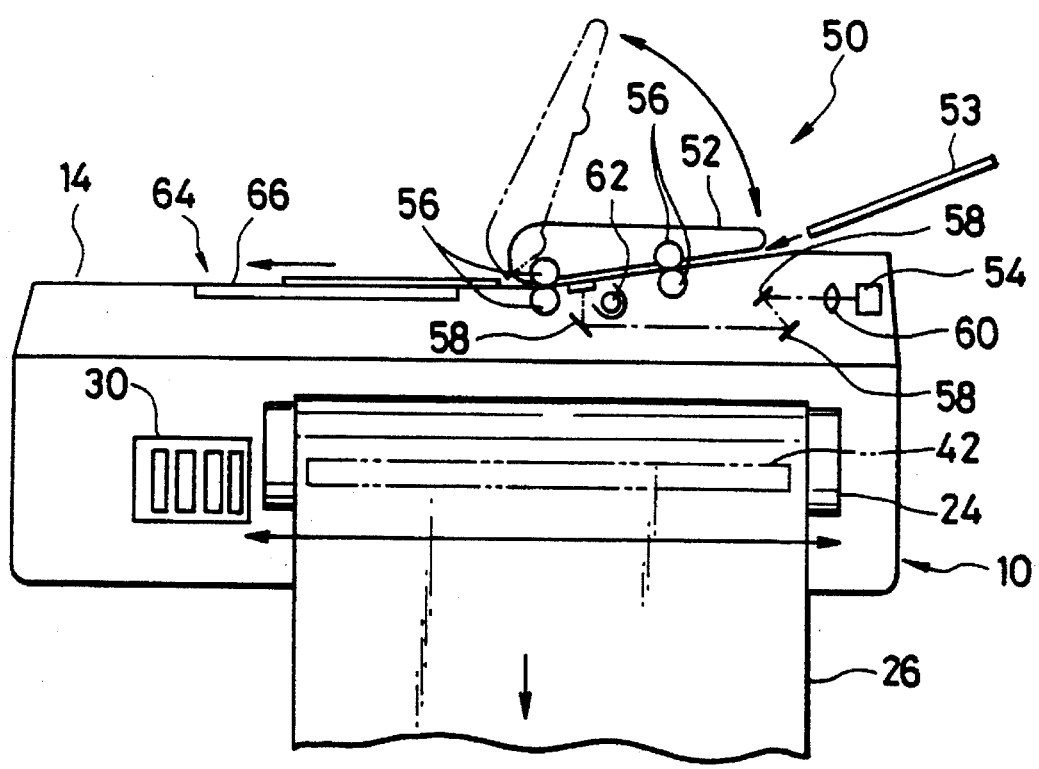
FIG. 4 is a front view of the system shown in FIGS. 1 to 3.

The conveyer mechanism comprises, as shown in FIG. 4, has two pairs of rollers 56 for grasping the original document 53 from the upper and lower sides to pass the same from the right to the left as viewed in FIG. 4, the roller pair 56 mounted on the housing 10 are rotated by a drive motor (not shown). The optical system comprises a proper number of mirrors 58 and a lens 60. Reference numeral 62 designates a light source.

A digitizer 64 is disposed, to be used as the area input means, at the discharge side, i.e. adjacent to the left side of the scanner 50 on the top face of the panel 14. The digitizer 64 comprises a tablet 66 for the detection of the co-ordinates and a stylus pen 68. The tablet 66 includes a resistor expanding over whole area thereof, and a particular position on the co-cordinates may be detected by sensing the change in resistance of the resistor upon pressing of the tablet 66 by tip end of the stylus pen 68. A particular position, for example the upper right corner point, of the tablet 66 is set to be a base or zero point, and the original document 53 is fixedly positioned while putting the upper right corner of the original document 53 precisely on the base point.

Reference numeral 70 designates an image monitor (LCD monitor) constructed of a liquid crystal plate, and reference numeral 72 designates a keyboard serving as the color input means for instructing the content of edition data, these members being mounted on the upper face of the cover lid 52 of the scanner 50. As shown in detail in FIGS. 1 and 5, the monitor 70 is arranged at the remoter portion on the upper face of the cover lid 52, and the keyboard 72 is arranged before the monitor 70. The operation of the keyboard 72 will be described in detail hereinafter.

An operation panel 74 shown in FIG. 6 is disposed in front of the scanner 50. Referring to FIG. 6, the operation panel 74 contains an inspection print key 76, a start/stop switch 78, an input key 80 for instructing the number of copies to be printed, a size selecting key 82 for designating the size of enlarged copy to be discharged from the system, and a mode exchange key 84.

The inspection print key 76 is operated to print out a colored copy of reduced size before printing out the ordinary copies in order to inspect or visually examine the colored image by the user to examine whether the used colors give desired impression or not. The start/stop switch 78 is provided to start and/or stop the operations of the scanner 50 and the printer 20. The size selecting key 82 is used to selectively exchange the size of the printed copy discharged from the system.

The mode exchange key 84 is provided to exchange the system between the character reading mode and the photograph reading mode so as to operate the system to read the original 53 as an image formed by characters or as a photographic image.

As shown in FIG. 7, the printer 20, the scanner 50, the digitizer 64, the monitor 70, the keyboard 72 and the keys 76, 78, 80, 82 and 84 on the operation panel 74 are connected through respective interfaces 86a to 86e to a bus 88.

To the bus 88, further connected are CPU 90, ROM 92, RAM 94 and a tone graduation discriminator 96. The ROM 92 stores operation program for operating the CPU 90, various constants and data relating to colors according to the invention. The RAM 94 is fed with and stores, as the data relating to images, information relating to the co-ordinates showing the changing points of images appearing on the scanning lines and information relating to colors and patterns input after the detection of the changing points. These data are stored in the condensed groups. Meantime, CPU 90 is used as the coloring processor means.

The tone graduation discriminator 96 is provided to discriminate the character image and the photographic image from the image data read by the scanner 50 to put out the thus discriminated character or photographic image data separately. A known type IC may be used as the tone graduation discriminator 96.

The data stored in ROM 92 are data relating to grouped colors giving or inducing similar mental or psychological impressions or effects, data relating to color grouping or coordination for inducing some special impressions by combining the colors belonging to same group. Such groupings of colors are done referring to some particular standard. Each of the color groups includes plural sub-groups. ROM 92 serves as the memory means for storing plural grouped colors well harmonizing or well-matching with each other to be used simultaneously on a single printed copy.

Referring back to FIG. 1, reference numeral 98 designates a CRT monitor, which is used as the image display means in the invention, capable of displaying a colored image which has been processed or just being processed. As shown in FIG. 10, an image read by the sannner 50 is displayed on the left half display face of the CRT monitor 98, and color arrangement or color scheme displays are shown on the right half display face of the CRT monitor 98 when the system is in the automatic color arranging mode. Meanwhile, the system may be selectively brought to the automatic color arranging mode by pushing the automatic arrangement key 1G (see FIGS. 5 and 12), as will be described in detail hereinafter.

Operation of the System

The operation of the illustrated embodiment will now be described in detail with reference to FIGS. 5 to 14. When the original document 53 contains regions or areas formed of characters (character areas), regions or areas formed of photographs (photograph areas) and regions or areas in which characters and photographs are intermingled or overlapped (overlap areas), the original document 53 is subjected to repeated image reading steps to read the character images and the photograph images separately, and then the images are separately subjected to image processing and coloring steps, and the thus separately processed images are synthesized or assembled on a single paper sheet to be discharged as a printed copy. The character image includes a letter, pattern and figure, other than photograph having half tone image, drawn by liner or curved lines.

Prior to reading the images on the original document 53, the system is brought to the character mode by pushing the mode exchange key 84 (see FIG. 6) (Step 200). The original document 53 is set in the scanner 50 (Step 202) and the start/stop switch 78 is pushed down (Step 204), whereby the scanner 50 is actuated to read the images on the original document 53.

The data relating to the thus read images is fed to the tone graduation discriminator 96 where the data is subjected to discrimination so that the character areas are discriminated from the photograph areas. At this step, the character areas and only the character images in the overlap areas are subjected to subsequent image processing, and the data thus obtained are stored in RAM 94. At this step, both the image data in the photograph areas and the image data relating to the photographic images in the overlap areas are set aside and not to be stored in the RAM 94. The image data read at this step is passed to the LCD monitor 70 so that the read character images displayed on the monitor 70.

Then, the character images are subjected to coloring edition processing through the following operation sequence. The original document 53 discharged from the scanner 50 is set in the tablet 66 of the digitizer 64 (Step 206), and the character areas are subjected to coloring edition (Step 208). This coloring process or coloring edition is effected by using the stylus pen 68 and the keyboard 72 while observing the character images displayed on the LCD monitor 70 and the CRT monitor 98.

Initially, the content of operation applied to the image displayed on the monitor 70 is selected from the modes M1, M2 and M3 (see FIG. 5). The mode M1 is a color-filling mode wherein the closed area completely encircled by the contour line of the character image is filled or painted with a desired color (FIG. 9, Step 210). If color-filling is desired, a single position pointing key K1 is pushed down (Step 212) and a point within the closed area to be filled with color is designated by the stylus pen 68 of the digitizer 64 (Step 214) so that the closed area to be filled with color is memorized.

The mode M2 is a color change mode which is selected when the color or pattern of a particular area is desired (Step 216). As the method of defining the particular area, the two-position pointing method or the plural-position pointing method may be selectively used. The two-position pointing method is a method wherein the co-ordinates of diagonally opposing points of a particular rectangular area to be defined are designated by the stylus pen 68 of the digitizer 64. The two-position pointing method may be selected by pushing down a key K2 (Step 218). The multiple-position pointing method is a method wherein respective corner points of a particular polygonal area are designated by using the styrus pen 68 of the digitizer 64 to define the area. The plural-position pointing method may be selected by pushing down a key K3 (Step 220). After the method to be used is selected by pusing the key K2 or K3, the coordinates are inputted through the digitizer 64 (Step 214).

The mode M3 is a mode wherein the background of a certain region containing therein an image or character(s) is colored (Step 222). After defining the background region to be processed at this step through a two-position pointing key K4 or a multiple-position pointing key K5 (Step 224 or 226), the coordinates are input through the digitizer 64 (Step 214).

After the input data relating to the area to be processed is stored, a pattern to be put to the area is selected (Step 228). The selection of the pattern may be effected by depressing any desired key in the standard pattern selecting key group P3 or in the registered pattern selection key group P4 (see FIG. 5). After the completion of selection of the pattern, a particular color is designated (Step 230). In the case where no pattern is put to the area, a desired color may be selected or designated while omitting the pattern selecting operation. The color designating operation may be carried out by pushing a desired key which is selected from a standard color group (standard color palette) P1 and a registered color group (registered color palette or menu) P2. When it is desired to determine the color density, a desired color density is selected by depressing any one of the density key group P5 prior to selection of color.

The color designating operation at Step 230 may be carried out in the automatic color arranging mode, according to the invention. In this operation mode, colors which are harmonized or well-matched with each other and thus can be used to give a coordinated impression are grouped so that coordinated or unified coloring can be easily made by selecting one of the thus grouped color sets.

When the automatic color arranging mode is adopted, the system is brought to the initial stage where the character image to be processed is displayed on the left half on the CRT monitor 98 as shown in FIG. 10 (Step 300 in FIG. 13). The registered color key group P2 on the keyboard 72 includes three rows F, G and H each containing 10 keys, as will be seen from FIG. 12. The leftmost keys of respective rows are scroll key 1F, automatic color arranging key 1G and a photograph key 1H. The keys subsequent to the second keys of respective rows, namely the keys 2F, 3F, - - - 0F, 2G, 3G, - - - 0G and 2H, 3H, - - - 0H, are keys for designating registered colors.

When the automatic color arranging key 1G is pushed down, the system is brought to the automatic color arranging mode (FIG. 13, Step 302), so that a color arrangement display is displayed on the LCD monitor (Step 304). As shown in FIG. 13, the mental effects or impressions given by the color groups, any of which could be selectively used, are pronounced. In detail, in the example shown in FIG. 13, nine groups respectively giving elegant, sporty, classic, modern, formal, casual, romantic, dynamic and metallic impressions are displayed. By observing the display face of the LCD monitor 70, any one color group is selected and then any one of the keys 1A to 9A corresponding to the selected color groups is pushed to designate a particular color group (FIG. 13, Step 306).

For example, when the key 1A is pushed to designate an elegant color tone, six sub-grouped color sets are displayed at the right half on the CRT monitor 98 as seen from FIG. 10 (FIG. 13, Step 308). FIG. 11 is an enlarged view showing portions of the color arrangements, and three sub-grouped color combinations No. 1 to No. 3 are displayed with colored image. Although additional sub-groups No. 4 to No. 6 are also shown on the CRT monitor 98, the colored images of these color sub-groups are not shown in FIG. 11 for the purpose of simplicity.

Each of these color sub-groups contains nine colors, and by pushing the scroll key 1F the positions of sub-groups may be sequentially changed so that any desired sub-groups can be positioned to be displayed on the uppermost row. For example, by pusing the scroll key F1 for one time under the condition as shown in FIG. 11 where No. 1 sub-group is displayed on the uppermost row, No. 2 sub-group is moved to the uppermost row; and by pushing the scroll key F1 for two times, No. 3 sub-group is moved to the uppermost row.

The nine colors contained in the sub-group displayed on the uppermost row correspond to the second to tenth (0th) keys, (2F, 3F, - - - 0F keys); and by pushing one of these keys (2F, 3F, - - - 0F keys), a desired color can be selected or designated. Meantime, the colors displayed at the leftmost positions in respective sub-groups (No. 1 to No. 6), namely the color shown by 2F in FIG. 11 and the colors vertically arranged below 2F, show colors to be used as the background colors, each being also displayed as the color filling the inside of each display frame of respective sub-groups (No. 1, 2, - - - ). The four colors 3F to 6F are recommendable colors, which are set or stored in the memory, when the system of the invention is supplied to a user. The remaining four colors 7F to 0F may be registered freely by the user.

When the color arranging operation as described above is selected and the automatic coloring mode is selected by pushing the automatic coloring key 1G and then a desired color group is selected through the keys 1A to 9A, the selected or designated color arrangement containing colors suited for use is shown on the right half on the CRT monitor 98 and the background region of the image displayed on the left half on the CRT monitor 98 is colored or filled with the background color which is shown at the position 2F of the color appearing on the uppermost row.

The filled background color is inspected by observing the color on the CRT monitor 98, and when the background color is acceptable, each area in the target image containing therein a character or figure or any other closed area to be colored is defined by the digitizer 64, and a color used for coloring each area selectively designated from the same color groups (FIG. 13, Step 310). Thus, the areas sequentially designated through the digitizer 64 are colored with the desired colors. The standard color key group P1 may be used at this step.

If the background color, which has been appointed automatically to smear the background region, is not acceptable, any desired sub-group containing an acceptable background color is set at the uppermost row displayed on the color arrangement on the CRT monitor 98 by pushing the scroll key 1F for desired times. Whereupon, the background color is changed to the color shown at the position 2F of the current uppermost color sub-group. By this operation, the colors of the characters, figures and/or closed areas, which are the colors contained in the former color sub-group before exchange of the background color, are changed to the colors of the corresponding keys 2F to 0F in the current color sub-group. There is no color change in the area filled or painted with the colors designated by any key of the standard color key group P1 and/or the registered color key group P2. A similar result is obtainable when a further different color group, for example sporty impression group, is selected and a first candidate sub-group of a newly selected color group is set on the uppermost row as a color arrangement.

The respective keys of the registered color key group P2 correspond to the registered colors in a mode other than the automatic color arranging mode. However, once the automatic color arranging key 1G is pushed to brought the system in the automatic color arranging mode, the colors of the uppermost row F correspond to the arranged colors displayed on the uppermost row on the CRT monitor 98. When the mode is returned back to the manual coloring mode by pushing the key 1G for one more time, the arranged color display disappears and keys 2F to 0F are used for designating the registered colors.

The contents of operations and the areas to be processed are instructed by input data; and if some of the input data must be corrected, the correction key K6 (FIG. 5) is pushed and then new data are put in the system. When no correction is needed, the inspection print key 76 (FIG. 6) is pushed down, as desired, to print out a small size printed copy (FIG. 9, Step 232) before production of a colored image of enlarged size.

When the inspection print key 76 is pushed (FIG. 14, Step 324, 316), a choice display for selecting the number of copies to be printed out from the system is displayed on the LCD monitor 70 (Step 318). In detail, the choice display is a display from which only one sort of copy bearing the image colored with the colors contained in the designated sub-group, i.e. the colors contained in the sub-group displayed at the uppermost row, should be printed out or six sorts of copies respectively bearing the images colored with the colors contained in the six sub-groups should be printed out.

When the inspection print key 76 is pushed down, the system is operated through the route a in FIG. 14 so that only one sort of print of reduced size is printed out (Steps 320, 322). By pushing the start/stop key 78, the system is operated through the route b in FIG. 14 (Step 324) so that six reduced-size images colored with different color sub-groups are printed out on a single printed copy while placing side by side relationship with each other (Step 326). Identification marks for indicating the used color group, the row number of the sub-groups are printed on the reduced-size print in order to facilitate identification of the used colors. Preferable sort of color arrangement to be used in the final printed copies are decided by inspecting six sorts of inspection copies to confirm the identification mark of the selected colors, and then the scroll key 1F is repeatedly pushed to move the color arrangement (color sub-group) to occupy the uppermost row on the CRT monitor 98 (Step 328).

After the desired color combination has been decided, the start/stop key 78 is pushed down (Step 330) to print out an enlarged copy (Step 332). The data input for the operation sequence as aforementioned are stored in the RAM 94.

In order to facilitate easier input operation in the coloring arrangement (color coordination) step, it is desirous that the scale of the displayed image is enlarged by three times, for instance. When the point or area to be enlarged is appointed by the digitizer 64, it is also desirous that the co-ordinates are moved such that the thus appointed area is displayed at the substantial center of the monitor 70 automatically.

After the coloring of the character image is completed, coloring of the photographic image is then effected. Initially, using the mode exchange key 84, the photograph mode is selected (FIG. 9, Step 234) and the color (hue), with which the photographic image in the photograph area and/or overlap area is colored, is selected (Step 236). Thus, the photograph area is expressed by the selected color having varied tone or densities.

After selectively setting the system to the photograph mode and then setting the original document 53 in the scanner 50 (Step 238), the size and number of copies to be printed out are designated and then the start/stop switch 78 is pushed down (Step 240), whereby the scanner 50 is actuated to read the image on the original document 53 and the printer 20 is actuated simultaneously.

The image data read through the scanner 50 is discriminated by the tone graduation discriminator 96 so that the character images and the photographic image are put out separately, the photograph area and only the photographic image within the overlap area being subjected to multinarization or similar necessary image processing. The character area(s) and the images of characters within the overlap area of the original document 53 are not processed at this step. The photographic image is subjected to image processing and then colored with the selected color selectively designated at the step 236.

Then, CPU 90 is energized in synchronism with the scanner 50 and the printer 20 to read out the binarized data of character images, which have been obtained at the color arranging step in the character processing mode and stored in the RAM 94, and to combine the thus read data with the multinarized image data of the photographical image processed in the photograph processing mode, whereby combined data are fed to the printer 20 (Step 242).

A paper sheet 26 for printing is supplied in the printer 20 in synchronism with reading of the image by the scanner 50, and the printing head 30 is moved to print images in an enlarged scale. The paper sheet on which the image is printed in an enlarged size is discharged to the rack 18 mounted below the housing 10.

Although the character area and the photograph area are discriminated by the tone graduation discriminator 96 not only at the first or primary mode for reading the character image but also at the second or later mode of reading the photograph area in the illustrated embodiment. However, the address(es) of the characters or letters and the address(es) or coordinates of the photograph area may be stored in the memory and only the photograph area is read in the second or later photograph reading mode.

Although the images of characters are combined with a photograph which is read in the photograph reading mode in the illustrated embodiment, the method or operation which does not contain the photograph reading mode is of course included in the scope of the invention. The CRT monitor 98 may be omitted when the LCD monitor 70 has a sufficiently high resolution capacity enough for displaying a colored image. Although the digitizer 64 is used as the area input means for defining the area to be colored in the embodiment described hereinabove, other pointing device such as a cursor or pointer appearing on the display face of the CRT monitor 98 may be used in lieu thereof.

As should be appreciated from the foregoing, since the colors having or giving coordinated or harmonized mental effects or impressions are grouped in plural groups which are stored in a memory, coordinated or unified coloring can be effected easily by anybody without professional sense or experiences only by selectively designating any desired one of the color groups. Accordingly, failure in color arrangement or coordination, resulting in unavailable production of printed copies, can be avoided.

Each of the plural color groups may be further grouped in plural color sub-groups. Thus, by designating one of these color sub-groups, further delicate color coordination can be realized without any professional sence or experiences. Collective change in coloring may be done, according to a further aspect of the invention, by arranging colors in each color sub-group in such a manner that similar or resembling colors occupies the same or corresponding seats in the color line-up contained in individual sub-group. With the provision of plural color sub-groups arranged as aforementioned, colors used in a particular colored copy can be changed collectively with each only by selecting a different sub-group.

According to a further preferred aspect of the invention, a printed copy of reduced size is produced for inspecting or visually examining the color coordination. Futhermore, plural color copies, which are respectively colored with colors of different sub-groups, may be printed out from the system of the invention while being placed side by side to allow easy comparison.

The system used for the practice of the method of the invention is provided. In a preferred embodiment, the colors designated to be used in the printed copy are displayed by colored images on the image display means to facilitate easier operation for the decision of the used color. Although the area input means may comprise a digitizer, a cursor or a pointer displayed on the CRT monitor may also be used as the area input means.

The color input means for feeding the data relating to particular color combination used to print out the image has preferably a key arrangement by which colors can be designated while visually confirming the colors displayed on the image display means, the keys being arranged such that they correspond respectively to the color arrangement displayed on the display means. It is also preferable that the result of color coordination effected by the color input means can be printed out, or may be transmitted through an information transmitting cable to a related instrument. According to another aspect of the invention, a printed image colored with colors of selected sub-groups or plural printed images colored with colors of plural sub-groups may be printed out in a reduced size for easy inspection or evaluation and for the prevention of failure in coloring operation.

What is claimed is:

1. An image processing method of coloring an image displayed on display means, comprising the steps of:

storing in a memory plural color groups, each including plural colors and giving an individually different mental effect or impression;

selecting a color group from said plural color groups;

displaying colors included in the thus selected color group on said display means together with the image, wherein each color group includes plural color sub-groups each containing matched colors from which desired colors may be selectively used;

displaying the colors contained in each of said sub-groups as a sequence on said display means, such that a set of displayed sequences shows the colors contained in each of said sub-groups as corresponding to colors contained in other sub-groups;

coloring the image by designating a particular color or colors in one color sub-group; and coloring the image with corresponding color or colors contained in the sequence of any other color sub-group by selecting said other sub-group.

2. The image processing method of claim 1, further comprising the step of printing plural printed images of reduced size, respective printed images being colored with colors of different color sub-groups.

3. An image processing system for coloring an image, comprising:

image display means for displaying the image having been filled with a color or just being filled with a color;

memory means for storing plural color groups, each including plural colors and giving an individually different mental effect or impression, wherein each color group includes plural color sub-groups each containing matched colors from which desired colors may be selectively used;

area input means for defining one or more areas to be colored with desired colors;

color input means for: selecting a color group from said plural color groups so as to display colors included in the selected color group on said image display means together with the image, the colors contained in each of said sub-groups being displayed as a sequence on said display means, such that a set of displayed sequences shows the colors contained in each of said sub-groups as corresponding to colors contained in other sub-groups; and for designating a particular color or colors in one color sub-group while viewing the colors in the selected color group displayed on said image display means; and coloring processor means for coloring said areas with said particular color or colors designated through said color input means and for coloring the image with corresponding color or colors contained in the sequence of any other color sub-group by selecting said other sub-group.

4. The image processing system of claim 3, wherein said area input means comprises a digitizer.

5. The image processing system of claim 3, wherein said color input means comprises a keyboard having plural keys each being capable of designating corresponding colors in the specified color group displayed on said image display means.

6. The image processing system of claim 3, further comprising a printer for printing out a colored image from the system.

7. The image processing system of claim 6, wherein said printer is capable of printing out plural reduced size colored images respectively colored with colors of different sub-groups on a single sheet.

* * * * *